US012634883B2

(12) United States Patent
Zhang et al.

(10) Patent No.: US 12,634,883 B2
(45) Date of Patent: May 19, 2026

(54) DATA TRANSMISSION DURING RRC INACTIVE STATE IN WIRELESS COMMUNICATION

(71) Applicant: Apogee Networks, LLC, Dallas, TX (US)

(72) Inventors: Jinfang Zhang, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 321 days.

(21) Appl. No.: 18/140,622

(22) Filed: Apr. 28, 2023

(65) Prior Publication Data

US 2023/0379881 A1 Nov. 23, 2023

(30) Foreign Application Priority Data

May 19, 2022 (CN) ......................... 202210552799.X

(51) Int. Cl.
| | |
|---|---|
| *H04W 68/02* | (2009.01) |
| *H04W 72/04* | (2023.01) |
| *H04W 72/20* | (2023.01) |
| *H04W 74/0833* | (2024.01) |
| *H04W 74/0836* | (2024.01) |

(52) U.S. Cl.
CPC ........... *H04W 68/02* (2013.01); *H04W 72/04* (2013.01); *H04W 72/20* (2023.01); *H04W 74/0833* (2013.01); *H04W 74/0836* (2024.01)

(58) Field of Classification Search
CPC ..... H04W 76/27; H04W 4/029; H04W 72/20; H04W 74/0833; H04W 74/0836
See application file for complete search history.

(56) References Cited

U.S. PATENT DOCUMENTS

| | | | |
|---|---|---|---|
| 10,299,244 B2 | 5/2019 | Griot et al. | |
| 11,039,415 B2 | 6/2021 | Hong | |
| (Continued) | | | |

FOREIGN PATENT DOCUMENTS

| | | |
|---|---|---|
| CN | 117098251 A | 11/2023 |
| WO | 2020147837 A1 | 7/2020 |
| (Continued) | | |

OTHER PUBLICATIONS

Third Generation Partnership Project, "Technical Specification Group Radio Access Network; NR; Physical layer procedures for data (Release 17)," 3GPP TS 38.214 V17.1.0 (Mar. 2022).

(Continued)

*Primary Examiner* — Raj Jain
(74) *Attorney, Agent, or Firm* — Volpe Koenig

(57) ABSTRACT

The present application provides a method and device for wireless communications. A first node receives a first paging message; as a response to receiving the first paging message, executes a first procedure, and the behavior of executing a first procedure comprises transmitting a first message; wherein the first paging message instructs a first radio bearer executing data transmission in RRC_INACTIVE state; the first message at least comprises a CCCH message; whether a first condition set is met is used to determine whether a first sub-message is comprised in the first message, when all conditions in the first condition set are met, the first message does not comprise the first sub-message; when any condition in the first condition set is not met, the first message comprises the first sub-message. The present application effectively supports downlink-triggered Small Data Transmission (SDT).

20 Claims, 6 Drawing Sheets

(56) References Cited

U.S. PATENT DOCUMENTS

| | | | |
|---|---|---|---|
| 12,177,919 B2 | 12/2024 | Zhang | |
| 12,213,101 B2 | 1/2025 | Yang et al. | |
| 2009/0061910 A1* | 3/2009 | Garba | H04W 8/18 |
| | | | 455/466 |
| 2015/0071260 A1* | 3/2015 | Chun | H04W 72/0446 |
| | | | 370/336 |
| 2016/0374048 A1 | 12/2016 | Griot et al. | |
| 2018/0270894 A1 | 9/2018 | Park et al. | |
| 2022/0078697 A1* | 3/2022 | Tseng | H04W 72/21 |
| 2023/0370945 A1* | 11/2023 | Chen | H04W 76/14 |
| 2023/0379881 A1* | 11/2023 | Zhang | H04W 72/04 |
| 2024/0206003 A1* | 6/2024 | Hao | H04W 76/19 |

FOREIGN PATENT DOCUMENTS

| | | | |
|---|---|---|---|
| WO | 2021031103 A1 | 2/2021 | |
| WO | 2021157895 A1 | 8/2021 | |

OTHER PUBLICATIONS

Third Generation Partnership Project, "Technical Specification Group Radio Access Network; NR; Medium Access Control (MAC) protocol specification (Release 17)," 3GPP TS 38.321 V17.0.0 (Mar. 2022).

Third Generation Partnership Project, "Technical Specification Group Radio Access Network; NR; Radio Resource Control (RRC) protocol specification (Release 17)," 3GPP TS 38.331 V17.0.0 (Mar. 2022).

Email discussion Rapporteur (Huawei, HiSilicon), "Summary of [Post115-e][507][SDT] MAC running CR update (Huawei) review issue list," 3GPP TSG-RAN2 Meeting #116e, R2-2110187, Electronic (Nov. 1-12, 2021).

Intel Corporation, "MT SDT mechanism (including configuration, paging, resume and capabilities)," 3GPP TSG RAN WG2 Meeting #122, R2-2305491, Incheon, Korea (May 22-26, 2023).

* cited by examiner

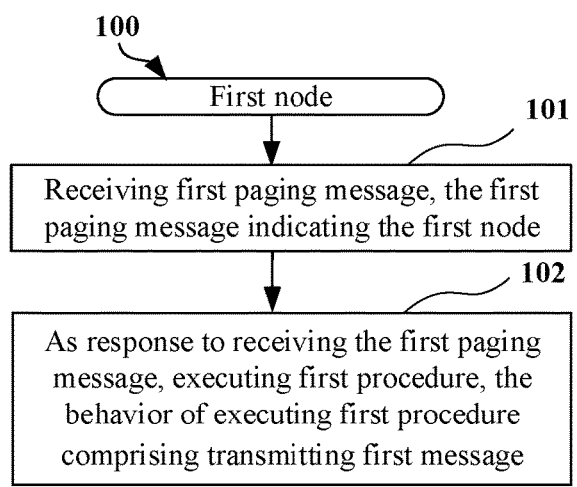

100

First node

101

Receiving first paging message, the first
paging message indicating the first node

102

As response to receiving the first paging
message, executing first procedure, the
behavior of executing first procedure
comprising transmitting first message

FIG. 1

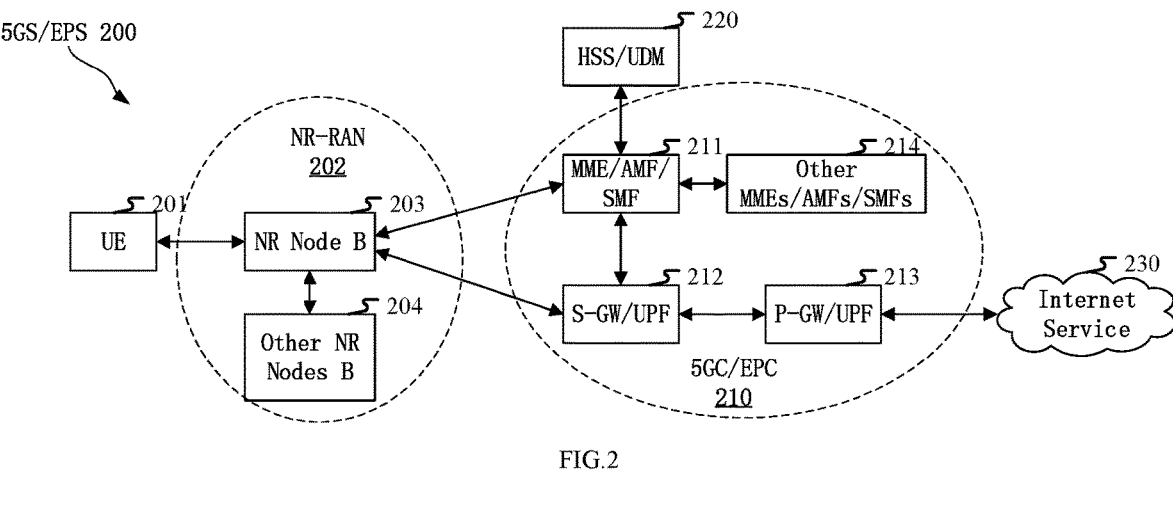

5GS/EPS 200

NR-RAN
202

UE ── 201

NR Node B ── 203

Other NR
Nodes B ── 204

HSS/UDM ── 220

MME/AMF/
SMF ── 211

Other
MMEs/AMFs/SMFs ── 214

S-GW/UPF ── 212

P-GW/UPF ── 213

Internet
Service ── 230

5GC/EPC
210

FIG.2

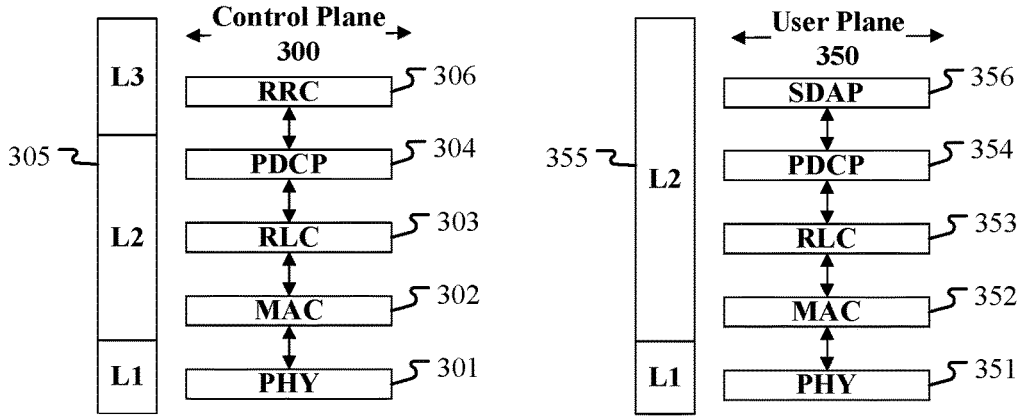

Control Plane
300

L3 | RRC ── 306

305

L2 | PDCP ── 304

RLC ── 303

MAC ── 302

L1 | PHY ── 301

User Plane
350

SDAP ── 356

355

L2 | PDCP ── 354

RLC ── 353

MAC ── 352

L1 | PHY ── 351

FIG. 3

PagingRecord ::=          SEQUENCE {
    ue-Identity              PagingUE-Identity,
    PagingCause              ENUMERATED {SDT}
    ......
}
            Case A
PagingGroup ::=          SEQUENCE {
    TMGI-Identity            TMGI,
    PagingCause              ENUMERATED {SDT}
    ......
}
            Case B
FIG. 8
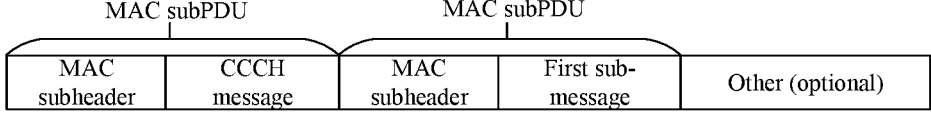
Case A
Case B
FIG. 9
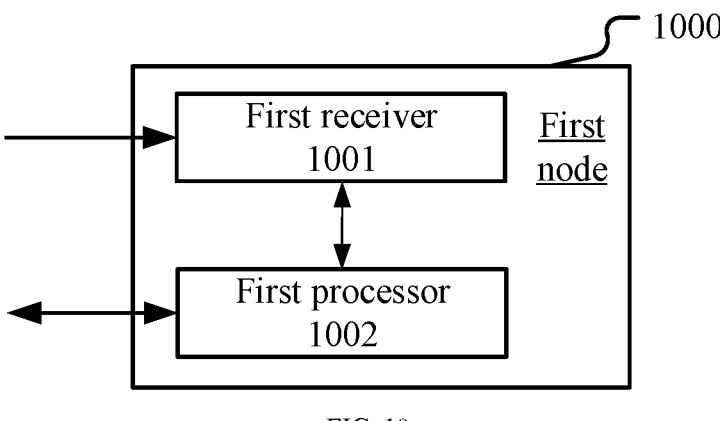
FIG. 10

DATA TRANSMISSION DURING RRC INACTIVE STATE IN WIRELESS COMMUNICATION

CROSS REFERENCE TO RELATED APPLICATIONS

This application claims the priority benefit of Chinese Patent Application No. 202210552799.X, field on May 19, 2022, the full disclosure of which is incorporated herein by reference.

BACKGROUND

Technical Field

The present application relates to methods and devices in wireless communication systems, and in particular to a method and device supporting downlink-triggered (DL-triggered) Small Data Transmission (SDT) in RRC_INAC-TIVE state in wireless communications.

Related Art

Radio Resource Control Inactive (RRC_INACTIVE) state is an RRC state newly introduced in New Radio (NR). When a user enters into the RRC_INACTIVE State, the user can reserve partial network configuration information. When a service arrives, the user can re-enter into RRC_CON-NECTED state for data transmission. Until Rel (version)-16, data transmission in RRC_INACTIVE State is not supported in 3rd Generation Partner Project (3GPP) Radio Access Network (RAN).

Application scenarios of future wireless communication systems are becoming increasingly diverse, with the rapid development of the Internet of Things (IoT), small data service will be an important service in future wireless communications. Small data services have characteristics of small data volume and low transmission frequency. For SDT, the signaling overhead of RRC state switching is greater than the transmission overhead of small data, which also increases the power consumption of User Equipment (UE). Therefore, an initiation of a Work Item (WI) of standardization work for uplink data-triggered SDT in RRC_INACTIVE state was decided at 3GPP RAN #88e plenary; an initiation of a WI of standardization work for downlink data-triggered SDT in RRC_INACTIVE state was decided at 3GPP RAN #94e plenary.

SUMMARY

Inventors have found through researches that the UE is in RRC_INACTIVE state and when there downlink data arrives, the network instructs initiating small data communications through paging a UE. The UE may have uplink non-small data arriving after receiving a paging message and before accessing the network, how the UE instructs to the network whether it is communicating through SDT or communicating by entering into RRC_CONNECTED state needs to be studied.

In response to the above problems, the present application discloses a solution to support downlink-triggered SDT in RRC_INACTIVE state, where the UE instructs to the network according to the availability of uplink data after receiving a paging message instructing the UE maintaining in RRC_INACTIVE state to execute an SDT, so that the network and the UE can reach the same understanding and can obtain the beneficial effect of saving signaling overhead and flexibly support SDT and data transmission in RRC_CONNECTED state. If no conflict is incurred, embodiments in a first node in the present application and the characteristics of the embodiments are also applicable to a second node, and vice versa. And the embodiments in the present application and the characteristics in the embodiments can be arbitrarily combined if there is no conflict. Though originally targeted at Uu air interface, the present application is also applicable to PC5 interface. Besides, the present application is not only targeted at scenarios of terminals and base stations, but also at V2X scenarios, terminals and relays as well as communication scenarios between relays and base stations, where similar technical effects can be achieved. Additionally, the adoption of a unified solution for various scenarios, including but not limited to V2X scenarios and communication scenarios between terminals and base stations, contributes to the reduction of hardware complexity and costs. Particularly, for interpretations of the terminology, nouns, functions and variants (if not specified) in the present application, refer to definitions given in TS36 series, TS38 series and TS37 series of 3GPP specifications.

The present application provides a method in a first node for wireless communications, comprising:

receive a first paging message, the first paging message indicating the first node; and as a response to receiving the first paging message, executing a first procedure, the behavior of executing a first procedure comprising transmitting a first message;

herein, the first paging message instructs a first radio bearer executing data transmission in RRC_INAC-TIVE state; the first message at least comprises a Common Control Channel (CCCH) message; whether a first condition set is met is used to determine whether the first message comprises a first sub-message, when all conditions in the first condition set are met, the first message does not comprise the first sub-message; when any condition in the first condition set is not met, the first message comprises the first sub-message; the first condition set at least comprises that there does not exist pending uplink data belonging to a radio bearer other than the first radio bearer set; radio resources occupied by an initial transmission in the first procedure are reserved for an SDT procedure.

In one embodiment, the above method is applicable for DL-triggered SDT.

In one embodiment, the above method instructs a radio bearer in a first radio bearer set to execute data transmission in RRC_INACTIVE state through the first paging message, which can reduce the signaling overhead introduced by RRC state switching.

In one embodiment, the above method instructs a radio bearer in a first radio bearer set to execute data transmission in RRC_INACTIVE state through the first paging message, which can reduce the access delay.

In one embodiment, the above method instructs the network through whether the first sub-message is comprised the first message, allowing the network and the UE to reach a same understanding and speeding up the resume of a radio bearer other than the first radio bearer.

In one embodiment, the above method instructs the network through whether the first sub-message is comprised the first message, allowing flexibility for backward compatibility and helping to reduce hardware complexity and cost.

In one embodiment, any radio bearer in the first radio bearer set is configured for data transmission in RRC_INACTIVE state.

In one embodiment, any radio bearer in the first radio bearer set is configured for a DL-triggered SDT.

In one embodiment, a radio bearer other than the first radio bearer set is not configured for data transmission in RRC_INACTIVE state.

In one embodiment, in RRC_INACTIVE state, a radio bearer other than the first radio bearer set maintains a suspended state.

In one embodiment, in RRC_INACTIVE state, a radio bearer in the first radio bearer set is resumed in an SDT procedure; herein, the SDT procedure is triggered by downlink data, or the SDT procedure is triggered by uplink data.

According to one aspect of the present application, comprising:

the first sub-message being a DCCH message;
herein, the SDT procedure is one of an RA-SDT procedure or a CG-SDT procedure.

According to one aspect of the present application, comprising:

when all conditions in the first condition set are met, accompanying transmitting the first message, resuming all radio bearer(s) in the first radio bearer set.

According to one aspect of the present application, comprising:

when all conditions in the first condition set are met, as a response to receiving the first paging message, resuming all radio bearer(s) in the first radio bearer set.

In one embodiment, the above method can reduce access delay.

According to one aspect of the present application, comprising:

when any condition in the first condition set is not met, receiving a second message, the second message being a response to the first message, the second message being used to instruct resuming all radio bearer(s) in the first radio bearer set and all suspended radio bearer(s) other than the first radio bearer set.

In one embodiment, the above method can be backward compatible with existing technologies, helping to reduce hardware complexity and cost.

According to one aspect of the present application, comprising:

a radio bearer other than the first radio bearer set is not configured to execute data transmission in the RRC_INACTIVE state, or a radio bearer other than the first radio bearer set is not established.

According to one aspect of the present application, comprising:

receiving a third message before receiving the first paging message, the third message being used to instruct entering into or maintaining the RRC_INACTIVE state;

herein, the third message is used to configure data transmission of the first radio bearer set in the RRC_INACTIVE state.

The present application provides a method in a second node for wireless communications, comprising:

transmitting a first paging message, the first paging message indicating the first node; and
receiving a first message, the first message being a response to the first paging message, the behavior of receiving a first message belonging to a first procedure;
herein, the first paging message instructs a first radio bearer executing data transmission in RRC_INAC- TIVE state; the first message at least comprises a CCCH message; whether a first condition set is met is used to determine whether the first message comprises a first sub-message, when all conditions in the first condition set are met, the first message does not comprise the first sub-message; when any condition in the first condition set is not met, the first message comprises the first sub-message; the first condition set at least comprises that there does not exist pending uplink data belonging to a radio bearer other than the first radio bearer set; radio resources occupied by an initial transmission in the first procedure are reserved for an SDT procedure.

According to one aspect of the present application, comprising:

the first sub-message being a DCCH message;
herein, the SDT procedure is one of an RA-SDT procedure or a CG-SDT procedure.

According to one aspect of the present application, comprising:

when all conditions in the first condition set are met, accompanying the first message being transmitted, all radio bearer(s) in the first radio bearer set being resumed.

According to one aspect of the present application, comprising:

when all conditions in the first condition set are met, accompanying the first message being transmitted, all radio bearer(s) in the first radio bearer set being resumed.

According to one aspect of the present application, comprising:

when any condition in the first condition set is not met, as a response to receiving the first message, transmitting a second message, the second message being used to instruct resuming all radio bearer(s) in the first radio bearer set and all suspended radio bearer(s) other than the first radio bearer set.

According to one aspect of the present application, comprising:

a radio bearer other than the first radio bearer set is not configured to execute data transmission in the RRC_INACTIVE state, or a radio bearer other than the first radio bearer set is not established.

According to one aspect of the present application, comprising:

transmitting a third message before transmitting the first paging message, the third message being used to instruct entering into or maintaining the RRC_INACTIVE state;

herein, the third message is used to configure data transmission of the first radio bearer set in the RRC_INACTIVE state.

The present application provides a first node for wireless communications, comprising:

a first receiver, receiving a first paging message, the first paging message indicating the first node; and
a first processor, as a response to receiving the first paging message, executing a first procedure, the behavior of executing a first procedure comprising transmitting a first message;
herein, the first paging message instructs a first radio bearer executing data transmission in RRC_INACTIVE state; the first message at least comprises a CCCH message; whether a first condition set is met is used to determine whether the first message comprises a first sub-message, when all conditions in the first condition set are met, the first message does not comprise the first sub-message; when any condition in the first condition set is not met, the first message comprises the first sub-message; the first condition set at least comprises that there does not exist pending uplink data belonging to a radio bearer other than the first radio bearer set; radio resources occupied by an initial transmission in the first procedure are reserved for an SDT procedure.

The present application provides a second node for wireless communications, comprising:

a first transmitter, transmitting a first paging message, the first paging message indicating the first node; and a second receiver, receiving a first message, the first message being a response to the first paging message, the behavior of receiving a first message belonging to a first procedure;

herein, the first paging message instructs a first radio bearer executing data transmission in RRC_INACTIVE state; the first message at least comprises a CCCH message; whether a first condition set is met is used to determine whether the first message comprises a first sub-message, when all conditions in the first condition set are met, the first message does not comprise the first sub-message; when any condition in the first condition set is not met, the first message comprises the first sub-message; the first condition set at least comprises that there does not exist pending uplink data belonging to a radio bearer other than the first radio bearer set; radio resources occupied by an initial transmission in the first procedure are reserved for an SDT procedure.

BRIEF DESCRIPTION OF THE DRAWINGS

Other features, objects and advantages of the present application will become more apparent from the detailed description of non-restrictive embodiments taken in conjunction with the following drawings:

FIG. 1 illustrates a flowchart of transmission of a first node according to one embodiment of the present application;

FIG. 2 illustrates a schematic diagram of a network architecture according to one embodiment of the present application;

FIG. 3 illustrates a schematic diagram of a radio protocol architecture of a user plane and a control plane according to one embodiment of the present application;

FIG. 8 illustrates a schematic diagram of a format of a first paging message according to one embodiment of the present application;

FIG. 9 illustrates a schematic diagram of a format of a first message according to one embodiment of the present application;

FIG. 10 illustrates a structure block diagram of a processor in a first node according to one embodiment of the present application;

DESCRIPTION OF THE EMBODIMENTS

Figure 4:
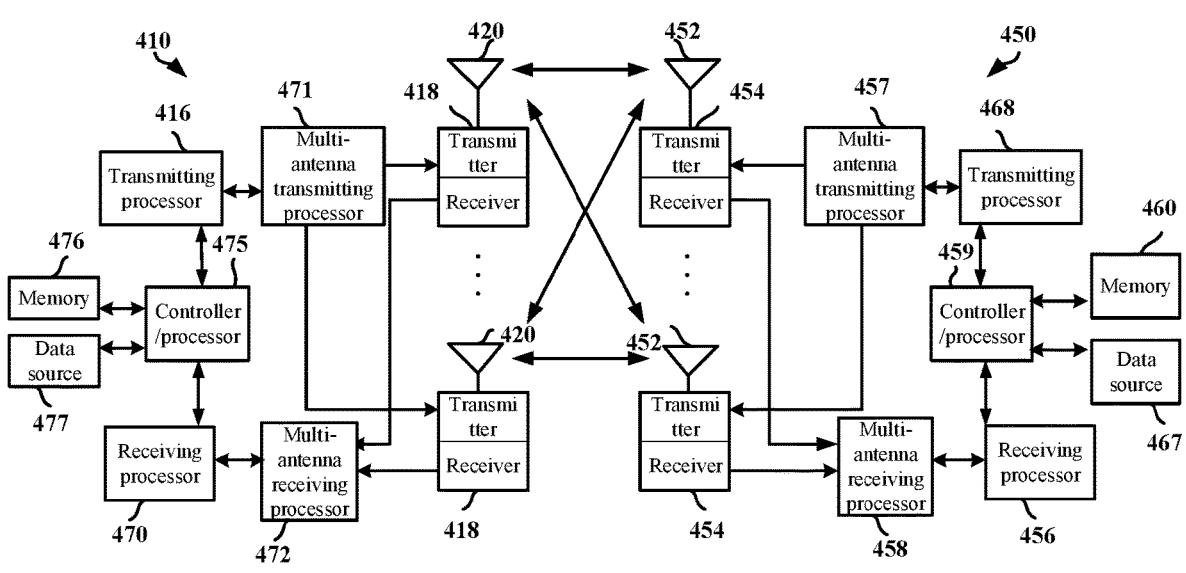
FIG. 4 illustrates a schematic diagram of hardware modules of a communication device according to one embodiment of the present application.

The technical scheme of the present application is described below in further details in conjunction with the drawings. It should be noted that the embodiments of the present application and the characteristics of the embodiments may be arbitrarily combined if no conflict is caused.

Embodiment 1

Embodiment 1 illustrates a flowchart of transmission of a first node according to one embodiment of the present application, as shown in FIG. 1.

In embodiment 1, a first node 100 receives a first paging message in step 101, and the first paging message instructs the first node; as a response to receiving the first paging message in step 102, executes a first procedure, and the behavior of executing a first procedure comprises transmitting a first message; herein, the first paging message instructs a first radio bearer executing data transmission in RRC_INACTIVE state; the first message at least comprises a CCCH message; whether a first condition set is met is used to determine whether the first message comprises a first sub-message, when all conditions in the first condition set are met, the first message does not comprise the first sub-message; when any condition in the first condition set is not met, the first message comprises the first sub-message; the first condition set at least comprises that there does not exist pending uplink data belonging to a radio bearer other than the first radio bearer set; radio resources occupied by an initial transmission in the first procedure are reserved for an SDT procedure.

In one embodiment, before receiving the first paging message, the first node is in RRC_INACTIVE state.

In one embodiment, a first paging message is received from an air interface, and the air interface is a Uu interface.

In one embodiment, the first paging message explicitly instructs the first node.

In one embodiment, the first paging message implicitly instructs the first node.

In one embodiment, the phrase that the first paging message instructs the first node comprises: the first paging message comprises a first identity, and the first identity is used to identify the first node.

In one embodiment, the phrase that the first paging message instructs the first node comprises: the first paging message comprises a second identity, the first node has joined one or multiple multicast/broadcast service (MBS) sessions instructs by the second identity, and the first paging message does not comprise an identity of the first node allocated by upper layer.

In one embodiment, the first paging message is received in a paging occasion of the first node.

In one embodiment, the first paging message is an RRC message.

In one embodiment, the first paging message is an RAN paging message.

In one embodiment, the first paging message is not a core network (CN) paging message.

In one embodiment, the first paging message is not used to change an RRC state where the first node is located.

In one embodiment, the first identity is allocated by RAN.

In one embodiment, the first identity is not allocated by upper layer.

In one embodiment, the upper layer is core network.

In one embodiment, the upper layer is Non-access stratum (NAS).

In one embodiment, the first identity is an Inactive-Radio Network Temporary Identifier (I-RNTI).

In one embodiment, the first identity comprises a complete I-RNTI value.

In one embodiment, the first identity comprises 40 bits.

In one embodiment, the second identity is a Temporary Mobile Group Identity (TMGI).

In one embodiment, the first paging message instructs a first radio bearer executing data transmission in RRC_INACTIVE state.

In one embodiment, the meaning that the first paging message instructs a first radio bearer executing data transmission in RRC_INACTIVE state is: the first paging message instructs an SDT.

In one embodiment, the meaning that the first paging message instructs a first radio bearer executing data transmission in RRC_INACTIVE state is: the first paging message instructs a mobile terminated (MT)-SDT.

In one embodiment, the first paging message instructs a cause for paging the first node is resuming all radio bearer(s) in the first radio bearer set and executing data transmission in the RRC_INACTIVE state.

In one embodiment, any radio bearer in the first radio bearer set is used for data transmission in RRC_INACTIVE state.

In one embodiment, any radio bearer in the first radio bearer set is in suspended state before receiving the first paging message.

In one embodiment, the first radio bearer set comprises at least one radio bearer.

In one embodiment, the first paging message is used to initiate an RRC connection resume procedure.

In one embodiment, as a response to receiving the first paging message, a first procedure is executed.

In one embodiment, the first procedure is used to request an RRC connection resume.

In one embodiment, the first procedure is used to request an SDT transmission.

In one embodiment, the first procedure is an SDT procedure.

In one embodiment, the SDT procedure comprises a random access (RA) SDT procedure and a configured grant (CG)-SDT procedure.

In one embodiment, the first procedure is an MT-SDT procedure.

In one embodiment, the first procedure is a random access procedure.

In one embodiment, the first procedure comprises a random access procedure.

In one embodiment, the first procedure comprises a Configured Grant (CG) transmission procedure.

In one embodiment, when the first procedure is a non-CG-SDT procedure, a transmission of the first message is not an initial transmission in the first procedure.

In one embodiment, when the first procedure is a CG-SDT procedure, a transmission of the first message is an initial transmission in the first procedure.

In one embodiment, the SDT procedure is used for an SDT.

In one embodiment, the SDT procedure is used for an uplink-triggered SDT.

In one embodiment, the first procedure comprises an SDT procedure in RRC_INACTIVE state in a random access procedure and after the random access is successful.

In one embodiment, an initial transmission in the first procedure is a first one of transmissions executed by a UE after transmitting the first procedure.

In one embodiment, radio resources occupied by an initial transmission in the first procedure are reserved for an SDT procedure.

In one embodiment, the phrase that radio resources are reserved for an SDT procedure comprises: radio resources occupied by a PRACH in a random access procedure are reserved for an SDT-triggered random access procedure; herein, the SDT procedure is an RA-SDT procedure.

In one embodiment, an initial transmission in the first procedure is transmitting a Physical Random Access CHannel (PRACH), and radio resources occupied by the PRACH are reserved for an SDT-triggered random access procedure.

In one subembodiment of the above embodiment, the SDT procedure is an RA-SDT procedure.

In one embodiment, an initial transmission in the first procedure is transmitting the first message, and radio resources occupied by the first message are reserved for a CG-SDT procedure.

In one subembodiment of the above embodiment, the SDT procedure is a CG-SDT procedure.

In one embodiment, the radio resources comprise at least one of time-domain resources, frequency-domain resources, code-domain resources or spatial-domain resources.

In one embodiment, the behavior of executing a first procedure comprises transmitting a first message.

In one embodiment, the first message at least comprises an RRC signaling.

In one embodiment, the first message at least comprises a Common Control Channel (CCCH) message.

In one embodiment, the first message is used to request resuming an RRC connection.

In one embodiment, the first message is a Medium Access Control (MAC) Protocol Data Unit (PDU).

In one embodiment, the first message belongs to a MAC PDU.

In one embodiment, the CCCH message is an RRCRe-sumeRequest.

In one embodiment, the CCCH message is RRCResum-eRequest1.

In one embodiment, the CCCH message comprises at least partial bits of the first identity; herein, the first identity is an I-RNTI.

In one embodiment, the CCCH message comprises the first identity.

In one embodiment, the CCCH identity comprises 40 bits, and the CCCH message comprises 24 bits in the first identity.

In one embodiment, the CCCH message comprises a resumeCause.

In one embodiment, the resumeCause is configured as a message in a first candidate message set.

In one embodiment, any message in the first candidate message set is used to instruct a cause requesting resuming an RRC connection as responding to the first paging message.

In one embodiment, the first candidate message set at least comprises highPriorityAccess, mt-Access, Multimedia Priority Service (mps)-PriorityAccess and Mission Critical Service (mcs)-PriorityAccess.

In one embodiment, setting the resumeCause based on an Access Identity configured by upper layer for the first node.

In one embodiment, when access identity 1 is configured by the upper layer, the resumeCause is set as mps-Priority-Access.

In one embodiment, when access identity 2 is configured by the upper layer, the resumeCause is set as mcs-Priority-Access.

In one embodiment, when access identity 11-15 is configured by the upper layer, the resumeCause is set as highPriorityAcces.

In one embodiment, when access identity 1 is not configured by the upper layer, access identity 2 is not configured by the upper layer, or access identities 11-15 are not configured by the upper layer, the resumeCause is set as mt-Access.

In one embodiment, the first processor determines whether a first sub-message is comprised in a first message according to whether a first condition set is met.

In one embodiment, the first condition set comprises at least one condition.

In one embodiment, the first sub-message is used to instruct that there exists pending uplink data belonging to a radio bearer other than the first radio bearer set, or, there exists pending uplink data belonging to the first radio bearer set and a condition for triggering an SDT does not meet one of the two.

In one embodiment, the first sub-message is used to instruct that there exists pending uplink data belonging to a radio bearer other than the first radio bearer set.

In one embodiment, the first sub-message is used to instruct that there exists pending uplink data belonging to the first radio bearer set and a condition triggering an SDT is not met.

In one embodiment, the first sub-message is used to instruct the need to switch from the RRC_INACTIVE state to RRC_CONNECTED state to execute data transmission.

In one embodiment, an arrival time of pending uplink data belonging to a radio bearer other than the first radio bearer set is not earlier than a time for receiving the first paging message and is not later than an initial time of the first procedure.

In one embodiment, the first condition set at least comprises the condition of there does not exist pending uplink data belonging to a radio bearer other than the first radio bearer set.

In one embodiment, the first condition set comprises there does not exist pending uplink data belonging to the first radio bearer set, or there exists pending uplink data belonging to the first radio bearer set and a condition for triggering an SDT procedure is used to meet the condition.

In one embodiment, the condition triggering an SDT procedure being met comprises meeting the following five conditions: upper layer requests an RRC connection resume; System Information Block 1 (SIB1) comprises sdt-Config-Common; sdt-Config is configured; all pending uplink data is mapped to a radio bearer configured with an SDT; lower layer instructs that a condition for triggering SDT is met.

In one embodiment, the condition for triggering an SDT procedure being met comprises meeting conditions in section 5.3.13 in 3GPP TS 38.331.

In one embodiment, the lower layer instructing that a condition for triggering SDT is met comprises meeting the following two conditions: data volume of the pending uplink data mapped to all radio bearer(s) configured with an SDT is not greater than a first threshold; Reference Signal Received Power (RSRP) of downlink pathloss reference is greater than a second threshold.

In one embodiment, the lower layer instructing that a condition for triggering an SDT is met comprises meeting a condition in section 5.27 in 3GPP standard TS 38.31.

In one embodiment, any radio bearer in the first radio bearer set is configured with an SDT.

In one embodiment, the meaning that all pending uplink data are mapped to a radio bearer configured with an SDT is: all pending uplink data is mapped to a radio bearer in the first radio bearer set.

In one embodiment, the first threshold and the second threshold are respectively configured by the network.

In one embodiment, the first threshold is sdt-DataVolumeThreshold.

In one embodiment, the second threshold is sdt-RSRP-Threshold.

In one embodiment, an arrival of the pending uplink data is not earlier than a reception of the first paging message.

In one embodiment, when all conditions in the first condition set are met, the first message does not comprise the first sub-message; when any condition in the first condition set is not met, the first message comprises the first sub-message.

In one embodiment, the first condition set only comprises that there does not exist pending uplink data belonging to a radio bearer other than the first radio bearer set.

In one subembodiment of the above embodiment, when there does not exist pending uplink data belonging to a radio bearer other than the first radio bearer set, the first condition set is met; when there exists pending uplink data belonging to a radio bearer other than the first radio bearer set, the first condition set is not met.

In one embodiment, the first condition set comprises two conditions: one condition is that there does not exist pending uplink data belonging to a radio bearer other than the first radio bearer set, and the other condition is that there does not exist pending uplink data belonging to the first radio bearer set, or, there exists pending uplink data belonging to the first radio bearer set and a condition for triggering an SDT procedure is met.

In one subembodiment of the above embodiment, when there does not exist pending uplink data belonging to a radio bearer other than the first radio bearer set, and there does not exist pending uplink data belonging to the first radio bearer set at the same time, or there exists pending uplink data belonging to the first radio bearer set and a condition for triggering an SDT procedure is met, all conditions in the first condition set are satisfied; when there exists pending uplink data belonging to a radio bearer other than the first radio bearer set, the first condition set is not met, or when there exists pending uplink data belonging to the first radio bearer set and a condition for triggering an SDT is not met, the first condition set is not met.

In one embodiment, when all conditions in the first condition set are met, the first procedure is an SDT procedure.

In one embodiment, when all conditions in the first condition set are met, the first procedure is an MT-SDT procedure.

In one embodiment, when any condition in the first condition set is not met, the first procedure is a random access procedure.

In one subembodiment of the above embodiment, radio resources occupied by a PRACH comprised in the random access procedure are reserved for an RA-SDT procedure.

Embodiment 2

Embodiment 2 illustrates a schematic diagram of a network architecture according to one embodiment of the present application, as shown in FIG. 2. FIG. 2 is a diagram illustrating a network architecture 200 of 5G NR, Long-Term Evolution (LTE), and Long-Term Evolution Advanced (LTE-A) systems. The NR 5G, LTE or LTE-A network architecture 200 may be called a 5G System (5GS)/Evolved Packet System (EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms, and in Non Terrestrial Networks (NTNs), the gNB 203 can be a satellite, an aircraft or a terrestrial base station relayed through a satellite. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, vehicle equipment, On-board communication unit, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the NR node B 203 corresponds to a second node in the present application.

In one embodiment, the gNB 203 is a Marco Cell base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station that supports large delay differences.

In one embodiment, the gNB 203 is a flight platform.

In one embodiment, the gNB 203 is satellite equipment.

In one embodiment, the gNB 203 is a test device (e.g., a transceiver device simulating some functions of a base station, a signaling tester).

In one embodiment, a radio link from the UE 201 to the gNB 203 is an uplink, and the uplink is used for executing an uplink transmission.

In one embodiment, a radio link from the gNB 203 to the UE 201 is a downlink, and the downlink is used for executing a downlink transmission.

In one embodiment, the UE 201 and the gNB 203 are connected via a Uu interface.

Embodiment 3

Embodiment 3 illustrates a schematic diagram of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for the control plane 300 of a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of the link between the UE and the gNB via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. The PDCP sublayer 304 provides data encryption and integrity protection and also provides support for a UE handover between gNBs. The RLC sublayer 303 provides segmentation and reassembling of a packet, retransmission of a lost data packet through ARQ, as well as repeat data packet detection and protocol error detection. The MAC sublayer 302 provides mapping between a logic channel and a transport channel and multiplexing of the logical channel ID. The MAC sublayer 302 is also responsible for allocating between UEs various radio resources (i.e., resources block) in a cell. The MAC sublayer 302 is also responsible for Hybrid Automatic Repeat Request (HARQ) operation. The Radio Resource Control (RRC) sublayer 306 in layer 3 (L3) of the control plane 300 is responsible for acquiring radio resources (i.e., radio bearer) and configuring the lower layer with an RRC signaling between the gNB and the UE. Although not shown, the RRC sublayer 306 in the control plane 300 of the UE may also have a V2X layer, and the V2X layer is responsible for generating a PC5 QoS parameter group and QoS rules according to received service data or service requests, a PC5

QoS flow is generated corresponding to a PC5 QoS param-eter group, and a PC5 QoS flow ID and the corresponding PC5 QoS parameter group are transmitted to an Access Stratum (AS) Layer for QoS processing of a packet belong-ing to the PC5 QoS flow ID by the AS layer; the V2X layer also comprises a PC5-Signaling Protocol sublayer, and the V2X layer is responsible for indicating whether each trans-mission of the AS layer is a PC5-S transmission or a V2X service data transmission. The radio protocol architecture of the user plane 350 comprises layer 1 (L1) and layer 2 (L2). In the user plane 350, the radio protocol architecture is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. The radio protocol architecture of the UE in the user plane 350 may comprises part or all of protocol sublayers of the SDAP sublayer 356, the PDCP sublayer 354, the RLC sublayer 353 and the MAC sublayer 352 at L2 layer. Although not described in FIG. 3, the UE may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, entities of multiple sublayers of the control plane in FIG. 3 form a Signaling Radio Bear (SRB) in the vertical direction.

In one embodiment, entities of multiple sublayers of the user plane in FIG. 3 form a Data Radio Bear (DRB) in the vertical direction.

In one embodiment, entities of multiple sublayers of the user plane in FIG. 3 form an MBS Radio Bearer (MRB) in the vertical direction.

In one embodiment, the radio protocol architecture in FIG. 3 is applicable to the first node in the present applica-tion.

In one embodiment, the radio protocol architecture in FIG. 3 is applicable to the second node in the present application.

In one embodiment, the first paging message in the present application is generated by the RRC 306.

In one embodiment, the first message in the present application is generated by the RRC 306.

In one embodiment, the first sub-message in the present application is generated by the RRC 306.

In one embodiment, the second message in the present application is generated by the RRC 306.

In one embodiment, the third message in the present application is generated by the RRC 306.

In one embodiment, the L2 layer 305 or 355 belongs to a higher layer.

In one embodiment, RRC sublayer 306 in the L3 layer belongs to a higher layer.

Embodiment 4

Embodiment 4 illustrates a schematic diagram of hard-ware modules of a communication device according to one embodiment of the present application, as shown in FIG. 4. FIG. 4 is a block diagram of a first communication device 450 in communication with a second communication device 410 in an access network.

The first communication device 450 comprises a control-ler/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a con-troller/processor 475, a memory 476, a data source 477, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from the core network or a higher layer packet from the data source 477 is provided to the controller/processor 475. The core network and the data source 477 represents all protocol layers above the L2 layer. The controller/processor 475 provides a function of the L2 layer. In the transmission from the second communication device 410 to the first commu-nication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retrans-mission of a lost packet and a signaling to the first commu-nication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correc-tion) at the second communication device 410 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna trans-mitting processor 471 performs transmission analog precod-ing/beamforming on the time-domain multi-carrier symbol streams. Each transmitter 418 converts a baseband multi-carrier symbol stream provided by the multi-antenna trans-mitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 resumes information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beam-forming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to resume any the first communication device-targeted spatial stream. Symbols on each spatial stream are demodulated and resumed in the receiving processor 456 to generate a soft decision. Then the receiving processor 456 decodes and de-interleaves the soft decision to resume the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In a transmission from the second communication device 410 to the first communication device 450, the controller/processor 459 provides multiplexing between a transport channel and a logical channel, packet reassembling, decryption, header decompression, control signal processing so as to resume a higher-layer packet from the second communication device 410. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to resume a higher-layer packet from the first communication device 450. The higher layer packet from the controller/processor 475 can be provided to all protocol layers above the core network or the L2 layer, and various control signals can also be provided to the core network or L3 layer for L3 layer processing.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: receives a first paging message, the first paging message instructs the first node; as a response to receiving the first paging message, executes a first procedure, and the behavior of executing a first procedure comprises transmitting a first message; herein, the first paging message instructs a first radio bearer executing data transmission in RRC_INACTIVE state; the first message at least comprises a CCCH message; whether a first condition set is met is used to determine whether the first message comprises a first sub-message, when all conditions in the first condition set are met, the first message does not comprise the first sub-message; when any condition in the first condition set is not met, the first message comprises the first sub-message; the first condition set at least comprises that there does not exist pending uplink data belonging to a radio bearer other than the first radio bearer set; radio resources occupied by an initial transmission in the first procedure are reserved for an SDT procedure.

In one embodiment, the first communication device 450 comprises: a memory that stores a computer readable instruction program. The computer readable instruction program generates an action when executed by at least one processor. The action includes: receiving a first paging message, the first paging message indicating the first node; as a response to receiving the first paging message, executing a first procedure, the behavior of executing a first procedure comprising transmitting a first message; herein, the first paging message instructs a first radio bearer executing data transmission in RRC_INACTIVE state; the first message at least comprises a CCCH message; whether a first condition set is met is used to determine whether the first message comprises a first sub-message, when all conditions in the first condition set are met, the first message does not comprise the first sub-message; when any condition in the first condition set is not met, the first message comprises the first sub-message; the first condition set at least comprises that there does not exist pending uplink data belonging to a radio bearer other than the first radio bearer set; radio resources occupied by an initial transmission in the first procedure are reserved for an SDT procedure.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first paging message, the first paging message instructs the first node; receives a first message, the first message is a response to the first paging message, the behavior of receiving a first message belongs to a first procedure; herein, the first paging message instructs a first radio bearer executing data transmission in RRC_I-NACTIVE state; the first message at least comprises a CCCH message; whether a first condition set is met is used to determine whether the first message comprises a first sub-message, when all conditions in the first condition set are met, the first message does not comprise the first sub-message; when any condition in the first condition set is not met, the first message comprises the first sub-message; the first condition set at least comprises that there does not exist pending uplink data belonging to a radio bearer other than the first radio bearer set; radio resources occupied by an initial transmission in the first procedure are reserved for an SDT procedure.

In one embodiment, the second communication device 410 comprises a memory that stores a computer readable instruction program. The computer readable instruction program generates an action when executed by at least one processor. The action includes: transmitting a first paging message, the first paging message indicating the first node; and receiving a first message, the first message being a response to the first paging message, the behavior of receiving a first message belonging to a first procedure; herein, the first paging message instructs a first radio bearer executing data transmission in RRC_INACTIVE state; the first message at least comprises a CCCH message; whether a first condition set is met is used to determine whether the first message comprises a first sub-message, when all conditions in the first condition set are met, the first message does not comprise the first sub-message; when any condition in the first condition set is not met, the first message comprises the first sub-message; the first condition set at least comprises that there does not exist pending uplink data belonging to a radio bearer other than the first radio bearer set; radio resources occupied by an initial transmission in the first procedure are reserved for an SDT procedure.

In one embodiment, the first communication device 450 corresponds to a first node in the present application.

In one embodiment, the second communication device 410 corresponds to a second node in the present application.

In one embodiment, the first communication device 450 is a UE.

In one embodiment, the second communication device 410 is a base station.

In one embodiment, at least one of the antenna 420, the transmitter 418, the multi-antenna transmitting processor 471, the transmitting processor 416 or the controller/processor 475 is used to transmit a first paging message in the present application.

In one embodiment, at least one of the antenna 452, the receiver 454, the multi-antenna receiving processor 458, the receiving processor 456 or the controller/processor 459 is used to receive a first paging message in the present application.

In one embodiment, at least one of the antenna 452, the transmitter 454, the multi-antenna transmitting processor 457, the transmitting processor 468 or the controller/processor 459 is used to transmit a first message in the present application.

In one embodiment, at least one of the antenna 420, the receiver 418, the multi-antenna receiving processor 472, the receiving processor 470 or the controller/processor 475 is used to receive a first message in the present application.

In one embodiment, at least one of the antenna 420, the transmitter 418, the multi-antenna transmitting processor 471, the transmitting processor 416 or the controller/processor 475 is used to transmit a second message in the present application.

In one embodiment, at least one of the antenna 452, the receiver 454, the multi-antenna receiving processor 458, the receiving processor 456 or the controller/processor 459 is used to receive second message in the present application.

In one embodiment, at least one of the antenna 420, the transmitter 418, the multi-antenna transmitting processor 471, the transmitting processor 416 or the controller/processor 475 is used to transmit a third message in the present application.

In one embodiment, at least one of the antenna 452, the receiver 454, the multi-antenna receiving processor 458, the receiving processor 456 or the controller/processor 459 is used to receive third message in the present application.

Embodiment 5

Figure 5:
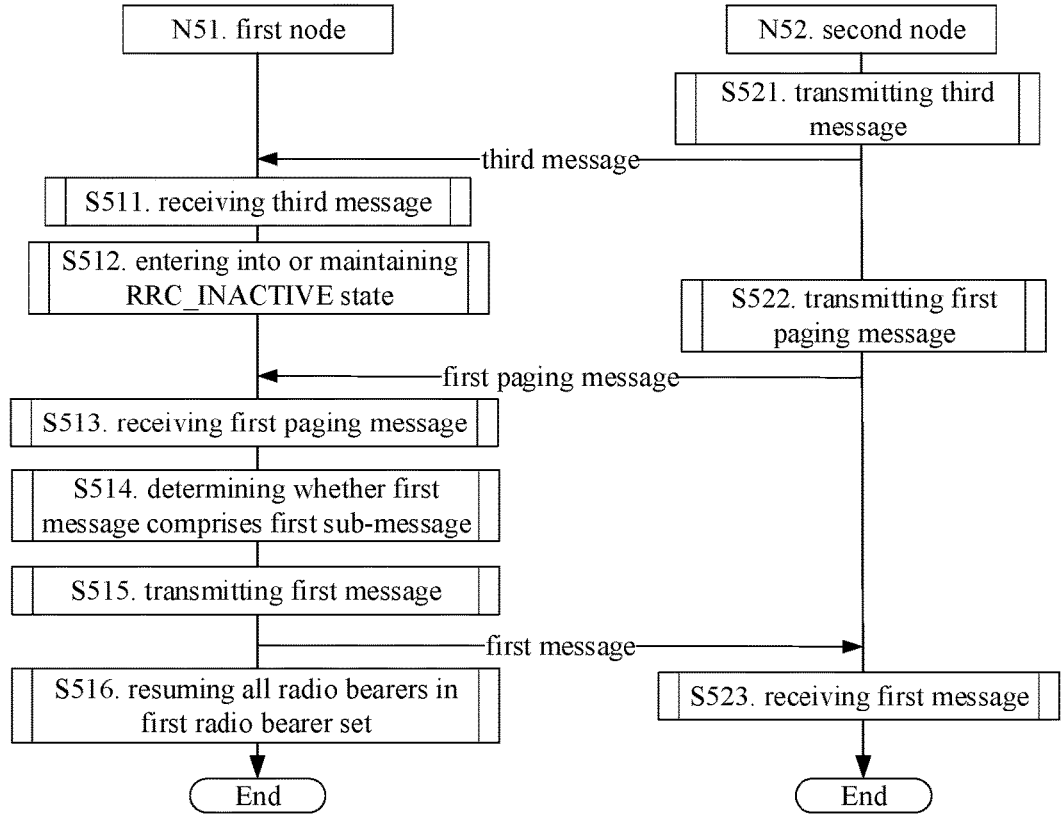
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, a first node N51 and a second node N52 are in communications via a radio interface. It is particularly underlined that the order illustrated in the embodiment does not put constraints over sequences of signal transmissions and implementations.

The first node N51 receives a third message in step S511; enters into or maintains RRC_INACTIVE state in step S512; receives a first paging message in step S513; determines whether a first sub-message is comprised in a first message in step S514; transmits a first message in step S515; resumes all radio bearer(s) in a first radio bearer set in step S516.

The second node N52 transmits a third message in step S521; transmits a first paging message in step S522; receives a first message in step S523.

In embodiment 5, a first paging message is received, and the first paging message instructs the first node; as a response to receiving the first paging message, a first procedure is executed, the behavior of executing a first procedure comprises transmitting a first message; herein, the first paging message instructs a first radio bearer executing data transmission in RRC_INACTIVE state; the first message at least comprises a CCCH message; whether a first condition set is met is used to determine whether the first message comprises a first sub-message, when all conditions in the first condition set are met, the first message does not comprise the first sub-message; when any condition in the first condition set is not met, the first message comprises the first sub-message; the first condition set at least comprises that there does not exist pending uplink data belonging to a radio bearer other than the first radio bearer set; radio resources occupied by an initial transmission in the first procedure are reserved for an SDT procedure; the first sub-message is a DCCH message; herein, the SDT procedure is one of an RA-SDT procedure or a CG-SDT procedure; when all conditions in the first condition set are met, accompanying transmitting the first message, all radio bearer(s) in the first radio bearer set are resumed; a radio bearer other than the first radio bearer set is not configured to execute data transmission in the RRC_INACTIVE state, or a radio bearer other than the first radio bearer set is not established; a third message is received before receiving the first paging message, the third message is used to instruct entering into or maintaining the RRC_INACTIVE state; herein, the third message is used to configure data transmission of the first radio bearer set in the RRC_INACTIVE state.

In one embodiment, the second node is a base station of a serving cell of the first node.

In one embodiment, the second node is a base station of a primary cell of the first node.

In one embodiment, the second node is a base station of a secondary cell of the first node.

In one embodiment, the second node is a base station of a camping cell of the first node.

In one embodiment, a third message is received before receiving the first paging message, the third message is used to instruct entering into or maintaining the RRC_INACTIVE state.

In one embodiment, the first receiver, as a response to receiving the third message, enters into or maintains the RRC_INACTIVE state.

In one embodiment, the third message comprises the first identity.

In one embodiment, the first identity is used to identify the first node in RRC_INACTIVE state.

In one embodiment, the first node is in RRC_CONNECTED state when the third message is received, and as a response to receiving the third message, enters into the RRC_INACTIVE state.

In one embodiment, the first node is in RRC_INACTIVE state when the third message is received, and as a response to receiving the third message, maintains the RRC_INACTIVE state.

In one embodiment, the third message is a higher-layer signaling.

In one embodiment, the third message is an RRC signaling.

In one embodiment, the third message is carried in all or partial Information elements (IEs) in an RRC signaling.

In one embodiment, the third message is carried in all or partial fields in an IE in an RRC signaling.

In one embodiment, the third message is an RRCRelease.

In one embodiment, the third message comprises suspendConfig.

In one embodiment, the third message comprises sdtConfig.

In one embodiment, the third message comprises mobile-terminated (mt)-sdt-Config.

In one embodiment, the third message comprises dl-sdt-Config.

In one embodiment, the third message instructs the first radio bearer set.

In one embodiment, the third message is used to configure data transmission in the RRC_INACTIVE state of all radio bearer(s) in the first radio bearer set.

In one embodiment, the third message comprises sdt-Config, the SDT configuration comprises radio bearer identities of all radio bearer(s) in the first radio bearer set, and the SDT configuration is used to configure data transmission of the first radio bearer set in the RRC_INACTIVE state.

In one embodiment, the behavior of entering into or maintaining the RRC_INACTIVE state comprises: suspending a second radio bearer set.

In one embodiment, the second radio bearer set comprises all radio bearer(s) established by the first node.

In one embodiment, the first radio bearer set is a subset of the second radio bearer set.

In one embodiment, when a radio bearer is suspended, the radio bearer is not used for data transmission.

In one embodiment, when a radio bearer is suspended, a radio bearer identifier of the radio bearer is not released.

In one embodiment, the behavior of entering into or maintaining the RRC_INACTIVE state comprises: instructing a Packet Data Convergence Protocol (PDCP) suspension to the lower layer of all radio bearer(s) in the second radio bearer set.

In one embodiment, the behavior of entering into or maintaining the RRC_INACTIVE state comprises: re-establishing a Radio Link Control (RLC) entity of Signaling Radio Bearer1 (SRB1).

In one embodiment, the behavior of entering into or maintaining the RRC_INACTIVE state comprises: re-establishing an RLC entity of all radio bearer(s) in the second radio bearer set.

In one embodiment, the behavior of entering into or maintaining the RRC_INACTIVE state comprises: resetting a MAC and if there is a default MAC Cell Group configuration, releasing the default MAC Cell Group configuration.

In one embodiment, the behavior of entering into or maintaining the RRC_INACTIVE state comprises: instructing a suspension of RRC connection to upper layer.

In one embodiment, the behavior of entering into or maintaining the RRC_INACTIVE state comprises: executing a cell selection.

In one embodiment, the first radio bearer set comprises a signaling radio bearer (SRB).

In one embodiment, the first radio bearer set does not comprise SRB1.

In one embodiment, the first radio bearer set comprises SRB2.

In one embodiment, the first radio bearer set comprises SRB3.

In one embodiment, the first radio bearer set comprises a data radio bearer (DRB).

In one embodiment, the first radio bearer set comprises an MBS.

In one embodiment, any radio bearer in the first radio bearer set is configured for an SDT transmission.

In one embodiment, any radio bearer in the first radio bearer set is configured for a downlink-triggered SDT transmission.

In one embodiment, any radio bearer in the first radio bearer set is used for data transmission in at least RRC_INACTIVE state.

In one embodiment, any radio bearer in the first radio bearer set is configured for data transmission in RRC_CONNECTED state.

In one embodiment, one or multiple MBS sessions indicated by the second identity that the first node has already joined are mapped to a radio bearer in the first radio bearer set.

In one embodiment, the SDT procedure is one of an RA-SDT procedure or a CG-SDT procedure.

In one embodiment, when the SDT procedure is an RA-SDT procedure, radio resources occupied by an initial transmission in the first procedure are reserved for a PRACH in the RA-SDT procedure.

In one embodiment, when the SDT procedure is a CG-SDT procedure, radio resources occupied by an initial transmission in the first procedure are Configured Uplink Grant reserved for a CG-SDT procedure.

In one embodiment, the executing a first procedure comprises executing a random access procedure, the executing a random access procedure comprises transmitting a PRACH, and radio resources occupied by the PRACH are reserved for an SDT-triggered random access procedure.

In one subembodiment of the above embodiment, the PRACH is an initial transmission in the first procedure.

In one subembodiment of the above embodiment, the first message is carried in Msg3 in a random access procedure comprised in the first procedure; herein, the random access procedure is 4-step random access procedure.

In one subembodiment of the above embodiment, the first message is carried in MsgA in a random access procedure comprised in the first procedure; herein, the random access procedure is 2-step random access procedure.

In one subembodiment of the above embodiment, in a system message, or, radio resources reserved for a PRACH comprised in the SDT procedure are configured in the third message.

In one embodiment, the executing a first procedure comprises executing Configured Grant Type 1.

In one subembodiment of the above embodiment, radio resources occupied by the first message are configured uplink grant reserved for a CG-SDT procedure.

In one subembodiment of the above embodiment, the first message is an initial transmission in the first procedure.

In one subembodiment of the above embodiment, the third message comprises configuration information of the configured grant type 1.

In one embodiment, the first sub-message is an RRC message.

In one embodiment, the first sub-message is a Dedicated Control Channel (DCCH) message.

In one embodiment, the first sub-message belongs to SRB1.

In one embodiment, the first sub-message belongs to SRB3.

In one embodiment, the first sub-message is carried in all or partial Information elements (IEs) in an RRC signaling.

In one embodiment, the first sub-message is carried in all or partial fields in an IE in an RRC signaling.

In one embodiment, the first sub-message is UEAssistanceInformation.

In one embodiment, the first sub-message is UEAssistanceInformation IE.

In one embodiment, the first sub-message comprises a nonSDT-DataIndication field.

In one embodiment, the first sub-message comprises a ResumeCause field, and ResumeCause is provided according to information received from upper layer.

In one embodiment, the first sub-message is used to indicate there exists pending uplink data belonging to a radio bearer other than the first radio bearer set.

In one embodiment, the first sub-message is used to indicate there exists pending uplink data belonging to a radio bearer not configured with an SDT.

In one embodiment, the first sub-message is a MAC sublayer message.

In one embodiment, the first sub-message is a MAC Control Element (CE).

In one embodiment, the first sub-message is a Buffer Status Report (BSR) MAC CE.

In one embodiment, the first sub-message is a nonSDT-DataIndication MAC CE.

In one embodiment, the pending uplink data arrives after receiving the first paging message and before initiating the first procedure.

In one embodiment, when all conditions in the first condition set are met, accompanying transmitting the first message, all radio bearer(s) in the first radio bearer set are resumed.

In one embodiment, when all conditions in the first condition set are met, accompanying transmitting the first message, a suspended radio bearer other than the first radio bearer set is not resumed.

In one embodiment, the behavior of accompanying a transmission of the first message, resuming all radio bearer(s) in the first radio bearer set comprises: the behavior of resuming all radio bearer(s) in the first radio bearer set is related to a transmission of the first message.

In one embodiment, the behavior of accompanying a transmission of the first message, resuming all radio bearer(s) in the first radio bearer set comprises: resuming all radio bearer(s) in the first radio bearer set and transmitting the first message are inseparable (atomic).

In one embodiment, the behavior of accompanying a transmission of the first message, resuming all radio bearer(s) in the first radio bearer set comprises: transmitting the first message and resuming all radio bearer(s) in the first radio bearer set are associated with each other.

In one embodiment, the behavior of accompanying a transmission of the first message, resuming all radio bearer(s) in the first radio bearer set comprises: transmitting the first message is used to resume all radio bearer(s) in the first radio bearer set.

In one embodiment, the behavior of accompanying a transmission of the first message, resuming all radio bearer(s) in the first radio bearer set comprises: upon transmission of the first message, resuming all radio bearer(s) in the first radio bearer set.

In one embodiment, the behavior of accompanying a transmission of the first message, resuming all radio bearer(s) in the first radio bearer set comprises: immediately after resuming all radio bearer(s) in the first radio bearer set, transmitting the first message.

In one embodiment, the behavior of resuming all radio bearer(s) in a first radio bearer set comprises: for each radio bearer comprised in the first radio bearer set, resuming a configuration associated with a masterCellGroup and a Radio Link Control (RLC) bearer of Packet Data Convergence Protocol (pdcp)-Config.

In one embodiment, the behavior of resuming all radio bearer(s) in a first radio bearer set comprises: for each radio bearer comprised in the first radio bearer set, re-establishing a PDCP entity.

In one embodiment, the behavior of resuming all radio bearer(s) in a first radio bearer set comprises: for each radio bearer comprised in the first radio bearer set, re-establishing a PDCP entity for a radio bearer in the case of not triggering a PDCP status reporting.

In one embodiment, accompanying transmitting the first message, SRB1 is resumed; herein, the first sub-message belongs to the SRB1.

In one embodiment, when all conditions in the first condition set are met, the first message only comprises the CCCH message.

In one embodiment, when all conditions in the first condition set are met, the first message comprises the CCCH message and at least one MAC SDU, and the at least one MAC SDU belongs to a radio bearer in the first radio bearer set and a condition for triggering the SDT procedure is met.

In one embodiment, a suspended radio bearer other than the first radio bearer set is only configured to execute data transmission in RRC_CONNECTED state.

In one embodiment, a radio bearer other than the first radio bearer set comprises a radio bearer not configured to be used for an SDT procedure.

In one embodiment, a radio bearer other than the first radio bearer set comprises a radio bearer not configured to be used for a downlink SDT procedure.

In one embodiment, a radio bearer other than the first radio bearer set comprises an un-established radio bearer.

In one embodiment, when the pending uplink data does not belong to any suspended radio bearer, a radio bearer used to transmit the pending uplink data is not established.

In one embodiment, when all conditions in the first condition set are met, and after an initial access of the first procedure is successful, the first node continues maintaining the RRC_INACTIVE state.

In one embodiment, in the RRC_INACTIVE state, the first receiver receives a first MAC Service Data Unit (SDU), and the first MAC SDU belongs to a radio bearer in the first radio bearer set.

In one embodiment, the first processor receives a fourth message, and the fourth message belongs to a random access procedure comprised in the first procedure.

In one embodiment, the fourth message is used to indicate that an initial access of the first procedure is successful.

In one subembodiment of the above embodiment, the fourth message is Msg4 in the random access procedure; herein, the random access procedure is 4-step random access procedure.

In one subembodiment of the above embodiment, the fourth message is MsgB in the random access procedure; herein, the random access procedure is 2-step random access procedure.

In one subembodiment of the above embodiment, the fourth message is a UE Contention Resolution Identity MAC CE.

In one subembodiment of the above embodiment, the fourth message is successRAR.

In one embodiment, the first processor receives a fifth message, and the fifth message belongs to configure grant type 1 comprised in the first procedure.

In one embodiment, the fifth message is used to indicate that an initial access of the first procedure is successful.

In one subembodiment of the above embodiment, the fifth message is a first downlink assignment received after the first message.

In one subembodiment of the above embodiment, the fifth message is Downlink Control Information (DCI).

Embodiment 6

Figure 6:
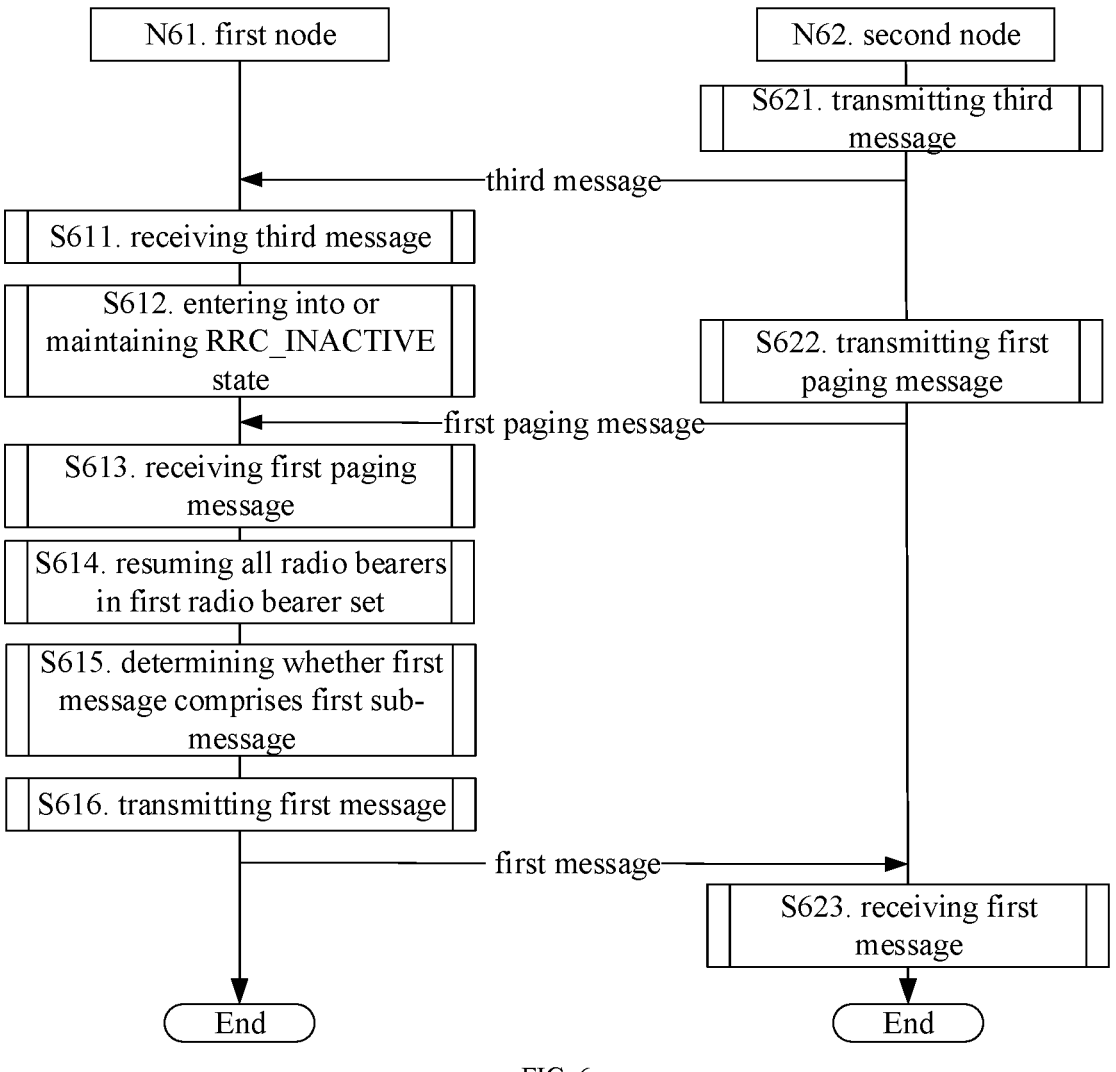
FIG. 6 illustrates another flowchart of radio signal transmission according to one embodiment of the present application.

Embodiment 6 illustrates another flowchart of radio signal transmission according to one embodiment in the present application, as shown in FIG. 6. In FIG. 6, a first node N61 and a second node N62 are in communications via a radio interface. It is particularly underlined that the order illustrated in the embodiment does not put constraints over sequences of signal transmissions and implementations.

The first node N61 receives a third message in step S611; enters into or maintains RRC_INACTIVE state in step S612; receives a first paging message in step S613; resumes all radio bearer(s) in a first radio bearer set in step S614; determines whether a first sub-message is comprised in a first message in step S615; transmits first information in step S616.

The second node N62 transmits a third message in step S621; transmits a first paging message in step S622; receives a first message in step S623.

In embodiment 6, a first paging message is received, and the first paging message instructs the first node; as a response to receiving the first paging message, executing a first procedure, and the behavior of executing a first procedure comprising transmitting a first message; herein, the first paging message instructs a first radio bearer executing data transmission in RRC_INACTIVE state; the first message at least comprises a CCCH message; whether a first condition set is met is used to determine whether the first message comprises a first sub-message, when all conditions in the first condition set are met, the first message does not comprise the first sub-message; when any condition in the first condition set is not met, the first message comprises the first sub-message; the first condition set at least comprises that there does not exist pending uplink data belonging to a radio bearer other than the first radio bearer set; radio resources occupied by an initial transmission in the first procedure are reserved for an SDT procedure; the first sub-message is a DCCH message; herein, the SDT procedure is one of an RA-SDT procedure or a CG-SDT procedure; when all conditions in the first condition set are met, as a response to receiving the first paging message, all radio bearer(s) in the first radio bearer set are resumed; a radio bearer other than the first radio bearer set is not configured to execute data transmission in the RRC_INACTIVE state, or a radio bearer other than the first radio bearer set is not established; a third message is received before receiving the first paging message, the third message is used to instruct entering into or maintaining the RRC_INACTIVE state; herein, the third message is used to configure data transmission of the first radio bearer set in the RRC_INACTIVE state.

In one embodiment, when all conditions in the first condition set are met, as a response to receiving the first paging message, all radio bearer(s) in the first radio bearer set are resumed.

Distinguishing from embodiment 5, the first paging message is used to trigger resuming all radio bearer(s) in the first radio bearer set.

In one embodiment, the first paging message is used to trigger resuming SRB1.

A resume time of all radio bearer(s) in the first radio bearer set in embodiment 6 is not later than a resume time of all radio bearer(s) in the first radio bearer set in embodiment 5.

Embodiment 7

Figure 7:
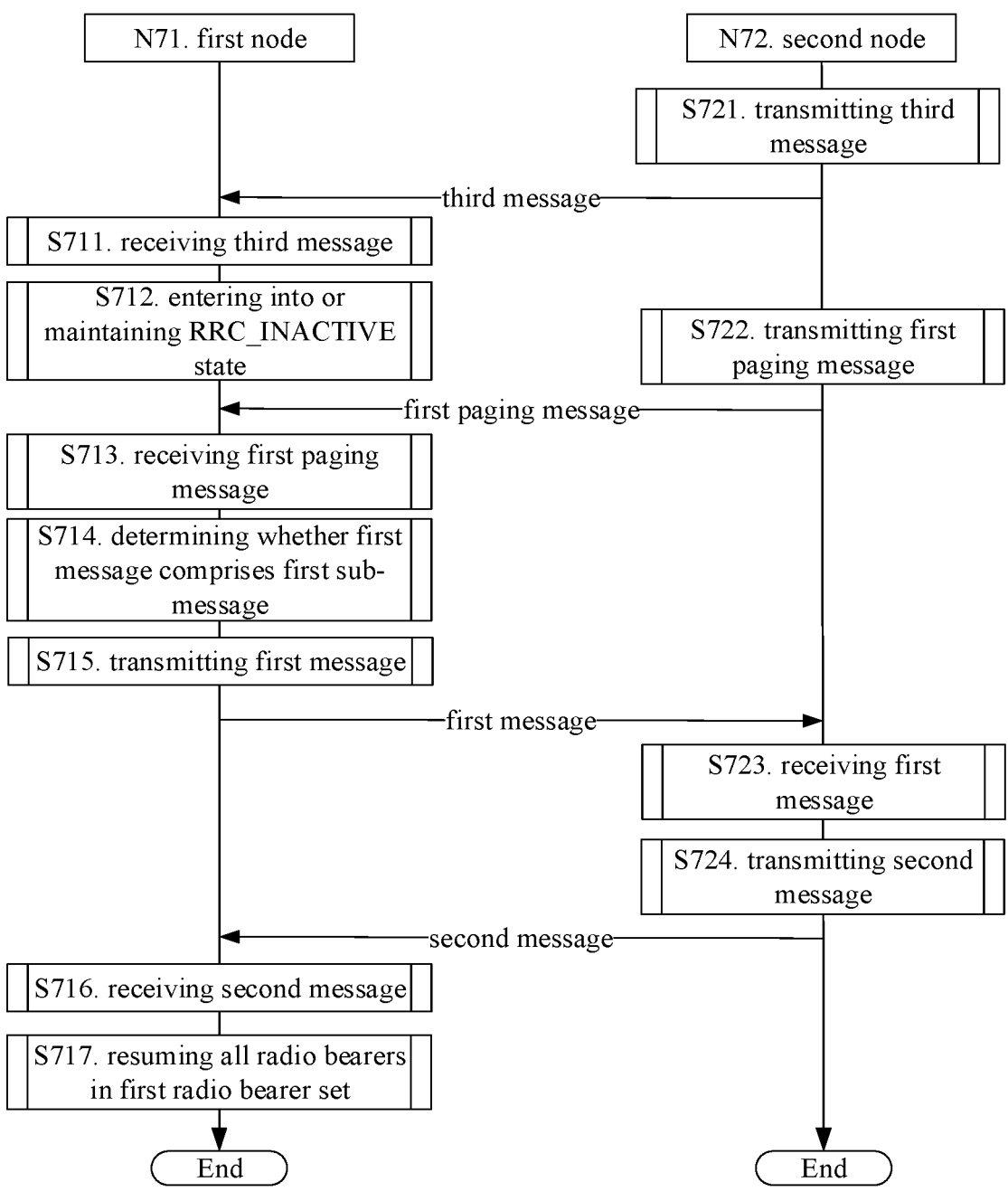
FIG. 7 illustrates a third flowchart of radio signal transmission according to one embodiment of the present application.

Embodiment 7 illustrates a third flowchart of radio signal transmission according to one embodiment of the present application, as shown in FIG. 7. In FIG. 7, a first node N71 and a second node N72 are in communications via a radio interface. It is particularly underlined that the order illustrated in the embodiment does not put constraints over sequences of signal transmissions and implementations.

The first node N71 receives a third message in step S711; enters into or maintains RRC_INACTIVE state in step S712; receives a first paging message in step S713; determines a first sub-message in step S714; transmits a first message in step S715; receives a second message in step S716; resumes all radio bearer(s) in a first radio bearer set in step S717.

The second node N72 transmits a third message in step S721; transmits a first paging message in step S722; receives a first message in step S723; transmits a second message in step S724;

In embodiment 7, a first paging message is received, and the first paging message instructs the first node; as a response to receiving the first paging message, a first procedure is executed, and the behavior of executing a first procedure comprises transmitting a first message; herein, the first paging message instructs a first radio bearer executing data transmission in RRC_INACTIVE state; the first message at least comprises a CCCH message; whether a first condition set is met is used to determine whether the first message comprises a first sub-message, when all conditions in the first condition set are met, the first message does not comprise the first sub-message; when any condition in the first condition set is not met, the first message comprises the first sub-message; the first condition set at least comprises that there does not exist pending uplink data belonging to a radio bearer other than the first radio bearer set; radio resources occupied by an initial transmission in the first procedure are reserved for an SDT procedure; the first sub-message is a DCCH message; herein, the SDT procedure is one of an RA-SDT procedure or a CG-SDT procedure; when any condition in the first condition set is not met, receiving a second message, the second message being a response to the first message, the second message being used to instruct resuming all radio bearer(s) in the first radio bearer set and all suspended radio bearer(s) other than the first radio bearer set; a radio bearer other than the first radio bearer set is not configured to execute data transmission in the RRC_INACTIVE state, or a radio bearer other than the first radio bearer set is not established; a third message is received before receiving the first paging message, the third message is used to instruct entering into or maintaining the RRC_INACTIVE state; herein, the third message is used to configure data transmission of the first radio bearer set in the RRC_INACTIVE state.

In one embodiment, when any condition in the first condition set is not met, receiving a second message, the second message being a response to the first message, the second message being used to instruct resuming all radio bearer(s) in the first radio bearer set and all suspended radio bearer(s) other than the first radio bearer set.

In one embodiment, the first receiver, as a response to receiving the second message, resumes all radio bearer(s) in the first radio bearer set and all suspended radio bearer(s) other than the first radio bearer set.

In one embodiment, when any condition in the first condition set is not met, accompanying transmitting the first message, all radio bearer(s) in the first radio bearer set are not resumed.

In one embodiment, the second message is an RRC signaling.

In one embodiment, the second message is carried in all or partial Information elements (IEs) in an RRC signaling.

In one embodiment, the second message is carried in all or partial fields in an IE in an RRC signaling.

In one embodiment, the second message is an RRCResume.

In one embodiment, the second message is used to instruct resuming an RRC connection.

In one embodiment, the first receiver, as a response to receiving the second message, enters into RRC_CONNECTED state.

In one embodiment, the first receiver, as a response to receiving the second message, resumes all suspended radio bearer(s).

In one embodiment, the second message is used to drop inactive Access Stratum (AS) context of the first node.

In one embodiment, the second message is used to release suspendConfig of the first node.

Embodiment 8

Embodiment 8 illustrates a schematic diagram of a format of a first paging message according to one embodiment of the present application, as shown in FIG. 8.

In one embodiment, the first paging message comprises a PagingRecord, and the PagingRecord comprises the first identity and a paging cause for paging the first node.

In one embodiment, the first paging message comprises a PagingGroup, and the PagingGroup comprises the second identity and a paging cause.

In one embodiment, the paging cause is an MT-SDT.

In one embodiment, the paging cause is an SDT.

In case A in embodiment 8, the first paging message comprises a PagingRecord, and the PagingRecord comprises a ue-Identity field and a PagingCause field, the ue-Identity field is used to indicate the first node, and the PagingCause is used to indicate that a paging cause for transmitting the first paging message is a downlink-triggered SDT; herein, the PagingUE-Identity is the first identity.

In case B in embodiment 8, the first paging message comprises a PagingGroup, the PagingGroup comprises a TMGI-Identity field and a PagingCause field, the TMGI-Identity field is used to indicate one or multiple MBS sessions indicated by the TMGI that the first node has joined, and the PagingCause is used to indicate that a paging cause for transmitting the first paging message is downlink-triggered SDT.

Embodiment 9

Embodiment 9 illustrates a schematic diagram of a format of a first message according to one embodiment of the present application, as shown in FIG. 9.

In one embodiment, the first message is a MAC PDU.

In one embodiment, a MAC PDU comprises at least one MAC subPDU.

In one embodiment, a MAC subPDU comprises a MAC subheader and a MAC SDU, or a MAC subheader and a MAC CE, or a MAC subheader and padding, or only a MAC subheader.

In one embodiment, the CCCH message is a MAC SDU.

In one embodiment, the first sub-message is a MAC SDU.

In one embodiment, the first sub-message is a MAC CE.

In one embodiment, the first message is a MAC PDU, and at least a former of a MAC subPDU generated by the CCCH message and a MAC subPDU generated by the first sub-message is used to generate the MAC PDU.

In case A of embodiment 9, the first message comprises a MAC subPDU generated by the CCCH message.

In case B of embodiment 9, the first message comprises a MAC subPDU generated by the CCCH message and a MAC subPDU generated by the first sub-message.

In one embodiment, other (optional) is a MAC subPDU comprising padding.

Embodiment 10

Embodiment 10 illustrates a structure block diagram of a processor in a first node according to one embodiment of the present application, as shown in FIG. 10. In FIG. 10, a processor 1000 in a first node comprises a first receiver 1001 and a first processor 1002; The first node 1000 is a UE.

In embodiment 10, the first receiver 1001 receives a first paging message, and the first paging message instructs the first node; the first processor 1002 as a response to receiving the first paging message, executes a first procedure, and the behavior of executing a first procedure comprises transmitting a first message; herein, the first paging message instructs a first radio bearer executing data transmission in RRC_INACTIVE state; the first message at least comprises a CCCH message; whether a first condition set is met is used to determine whether the first message comprises a first sub-message, when all conditions in the first condition set are met, the first message does not comprise the first sub-message; when any condition in the first condition set is not met, the first message comprises the first sub-message; the first condition set at least comprises that there does not exist pending uplink data belonging to a radio bearer other than the first radio bearer set; radio resources occupied by an initial transmission in the first procedure are reserved for an SDT procedure.

In one embodiment, the first sub-message is a DCCH message; herein, the SDT procedure is one of an RA-SDT procedure or a CG-SDT procedure.

In one embodiment, the first processor 1002, when all conditions in the first condition set are met, accompanying transmitting the first message, resumes all radio bearer(s) in the first radio bearer set.

In one embodiment, the first processor 1002, when all conditions in the first condition set are met, as a response to receiving the first paging message, resumes all radio bearer(s) in the first radio bearer set.

In one embodiment, the first receiver 1001, when any condition in the first condition set is not met, receives a second message, the second message is a response to the first message, the second message is used to indicate resuming all radio bearer(s) in the first radio bearer set and all suspended radio bearer(s) other than the first radio bearer set.

In one embodiment, a radio bearer other than the first radio bearer set is not configured to execute data transmission in the RRC_INACTIVE state, or a radio bearer other than the first radio bearer set is not established.

In one embodiment, the first receiver 1001 receives a third message before receiving the first paging message, the third message is used to instruct entering into or maintaining the RRC_INACTIVE state; herein, the third message is used to configure data transmission of the first radio bearer set in the RRC_INACTIVE state.

In one embodiment, the first receiver 1001 comprises the receiver 454 (comprising the antenna 452), the receiving processor 456, the multi-antenna receiving processor 458 and the controller/processor 459 in FIG. 4 of the present application.

In one embodiment, the first receiver 1001 comprises at least one of the receiver 454 (comprising the antenna 452), the receiving processor 456, the multi-antenna receiving processor 458 or the controller/processor 459 in FIG. 4 of the present application.

In one embodiment, the first receiver 1001 comprises the controller/processor 459 in FIG. 4 of the present application.

In one embodiment, the first processor 1002 comprises the receiver 454 (comprising the antenna 452), the receiving processor 456, the multi-antenna receiving processor 458 and the controller/processor 459 in FIG. 4 of the present application.

In one embodiment, the first processor 1002 comprises at least one of the receiver 454 (comprising the antenna 452), the receiving processor 456, the multi-antenna receiving processor 458 or the controller/processor 459 in FIG. 4 of the present application.

In one embodiment, the first processor 1002 comprises the transmitter 454 (comprising the antenna 452), the transmitting processor 468, the multi-antenna transmitting processor 457 and the controller/processor 459 in FIG. 4 of the present application.

In one embodiment, the first processor 1002 comprises at least one of the transmitter 454 (comprising the antenna 452), the transmitting processor 468, the multi-antenna transmitting processor 457 or the controller/processor 459 in FIG. 4 of the present application.

In one embodiment, the first processor 1002 comprises the controller/processor 459 in FIG. 4 of the present application.

Embodiment 11

Figure 11:
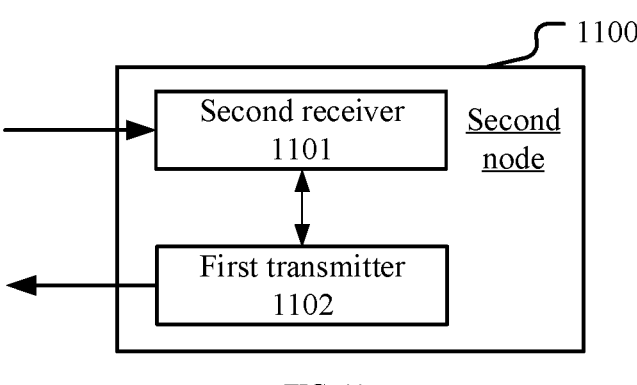
FIG. 11 illustrates a structure block diagram of a processor in second node according to one embodiment of the present application.

Embodiment 11 illustrates a structure block diagram of a processor in a second node according to one embodiment of the present application, as shown in FIG. 11. In FIG. 11, a processor 1100 in a second node comprises a second receiver 1101 and a first transmitter 1102; the second node 1100 is a base station.

In embodiment 11, the first transmitter 1102 transmits a first paging message, and the first paging message instructs the first node; a second receiver 1101 receives a first message, the first message is a response to the first paging message, the behavior of receiving a first message belongs to a first procedure; herein, the first paging message instructs a first radio bearer executing data transmission in RRC_I-NACTIVE state; the first message at least comprises a CCCH message; whether a first condition set is met is used to determine whether the first message comprises a first sub-message, when all conditions in the first condition set are met, the first message does not comprise the first sub-message; when any condition in the first condition set is not met, the first message comprises the first sub-message; the first condition set at least comprises that there does not exist pending uplink data belonging to a radio bearer other than the first radio bearer set; radio resources occupied by an initial transmission in the first procedure are reserved for an SDT procedure.

In one embodiment, the first sub-message is a DCCH message; herein, the SDT procedure is one of an RA-SDT procedure or a CG-SDT procedure.

In one embodiment, when all conditions in the first condition set are met, accompanying the first message being transmitted, all radio bearer(s) in the first radio bearer set are resumed.

In one embodiment, when all conditions in the first condition set are met, accompanying the first message being transmitted, all radio bearer(s) in the first radio bearer set are resumed.

In one embodiment, the first transmitter, when any condition in the first condition set is not met, as a response to receiving the first message, transmits a second message, the second message is used to instruct resuming all radio bearer(s) in the first radio bearer set and all suspended radio bearer(s) other than the first radio bearer set.

In one embodiment, a radio bearer other than the first radio bearer set is not configured to execute data transmission in the RRC_INACTIVE state, or a radio bearer other than the first radio bearer set is not established.

In one embodiment, the first transmitter 1102, transmits a third message before transmitting the first paging message, and the third message is used to instruct entering into or maintaining the RRC_INACTIVE state; herein, the third message is used to configure data transmission of the first radio bearer set in the RRC_INACTIVE state.

In one embodiment, the second receiver 1101 comprises the receiver 418 (comprising the antenna 420), the receiving processor 470, the multi-antenna receiving processor 472 and the controller/processor 475 in FIG. 4 in the present application.

In one embodiment, the second receiver 1101 comprises at least one of the receiver 418 (comprising the antenna 420), the receiving processor 470, the multi-antenna receiving processor 472 or the controller/processor 475 in FIG. 4 in the present application.

In one embodiment, the first transmitter 1102 comprises the transmitter 418 (including the antenna 420), the transmitting processor 416, the multi-antenna transmitting processor 471 and controller/processor 475 in FIG. 4 of the present application.

In one embodiment, the first transmitter 1102 comprises at least one of the transmitter 418 (including the antenna 420), the transmitting processor 416, the multi-antenna transmitting processor 471 or the controller/processor 475 in FIG. 4 of the present application.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. A first-type communication node or a UE or a terminal in the present application includes but not limited to mobile phones, tablet computers, laptops, network cards, low-power devices, enhanced Machine Type Communication (eMTC) devices, NB-IOT devices, vehicle-mounted communication equipment, aircrafts, airplanes, unmanned aerial vehicles (UAV), telecontrolled aircrafts and other wireless communication devices. The second-type communication node or the base station or the network side device in the present application includes but is not limited to the macro-cellular base stations, micro-cellular base stations, home base stations, relay base stations, eNB, gNB, Transmission and Reception Points (TRP), relay satellites, satellite base stations, air base stations and other wireless communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE) for wireless communications, the UE comprising:

a receiver configured to receive a first paging message indicating the UE and instructing a first radio bearer set to execute data transmission in radio resource control inactive (RRC_INACTIVE) state; and a processor and a transmitter configured to, as a response to receiving the first paging message, transmit a Common Control Channel (CCCH) message;

wherein a first condition set is used to determine whether the CCCH message comprises a first sub-message, wherein when all conditions in the first condition set are met, the CCCH message does not comprise the first sub-message; wherein, when any condition in the first condition set is not met, the CCCH message comprises the first sub-message; wherein the first condition set comprises that pending uplink data belonging to a radio bearer other than the first radio bearer set does not exist; and radio resources occupied by an initial transmission of the CCCH message are reserved for a small data transmission (SDT) procedure.

2. The UE according to claim 1, wherein the first sub-message is a dedicated control channel (DCCH) message; and wherein the SDT procedure is one of a random access (RA)-SDT procedure or a configured grant (CG)-SDT procedure.

3. The UE according to claim 1, wherein, when all conditions in the first condition set are met, the processor is further configured to resume all radio bearer(s) in the first radio bearer set.

4. The UE according to claim 1, wherein, when all conditions in the first condition set are met, as the response to receiving the first paging message, the processor is further configured to resume all radio bearer(s) in the first radio bearer set.

5. The UE according to claim 1, wherein, when any condition in the first condition set is not met, the receiver is further configured to receive a second message, in response to the CCCH message, the second message being used to instruct resuming all radio bearer(s) in the first radio bearer set and all suspended radio bearer(s) other than the first radio bearer set.

6. The UE according to claim 1, wherein a radio bearer other than the first radio bearer set is not configured to execute data transmission in the RRC_INACTIVE state, or a radio bearer other than the first radio bearer set is not established.

7. The UE according to claim 1, wherein the receiver is further configured to receive a third message before receiving the first paging message, the third message being used to instruct entering into or maintaining the RRC_INACTIVE state; and wherein the third message is used to configure data transmission of the first radio bearer set in the RRC_INACTIVE state.

8. A base station for wireless communications, the base station comprising:

a transmitter configured to transmit a first paging message indicating a user equipment (UE) and instructing a first radio bearer set to execute data transmission in radio resource control inactive (RRC INACTIVE) state; and a receiver configured to receive, in response to the first paging message, a Common Control Channel (CCCH) message;

wherein a first condition set is met is used to determine whether the CCCH message comprises a first sub-message, wherein, when all conditions in the first condition set are met, the CCCH message does not comprise the first sub-message; wherein when any condition in the first condition set is not met, the CCCH message comprises the first sub-message; wherein the first condition set comprises that pending uplink data belonging to a radio bearer other than the first radio bearer set does not exist; and radio resources occupied by an initial transmission of the CCCH message are reserved for a small data transmission (SDT) procedure.

9. The base station according to claim 8, wherein the first sub-message is a dedicated control channel (DCCH) message; and wherein the SDT procedure is one of a random access (RA)-SDT procedure or a configured grant (CG)-SDT procedure.

10. The base station according to claim 8, wherein when all conditions in the first condition set are met, all radio bearer(s) in the first radio bearer set are resumed.

11. The base station according to claim 8, wherein when all conditions in the first condition set are met, and as a further response to the first paging message being received, all radio bearer(s) in the first radio bearer set are resumed.

12. The base station according to claim 8,
wherein, when any condition in the first condition set is not met, as the response to receiving the CCCH message, the transmitter is further configured to transmit a second message used to instruct resuming all radio bearer(s) in the first radio bearer set and all suspended radio bearer(s) other than the first radio bearer set.

13. The base station according to claim 8, wherein a radio bearer other than in the first radio bearer set is not configured to execute data transmission in the RRC_INACTIVE state, or a radio bearer other than the first radio bearer set is not established.

14. The base station according to claim 8,
wherein the transmitter is further configured to transmit a third message before transmitting the first paging message, wherein the third message is used to instruct the UE into entering or maintaining the RRC_INACTIVE state; and wherein the third message is used to configure the UE for data transmission of the first radio bearer set in the RRC_INACTIVE state.

15. A method for a user equipment (UE) in wireless communications, comprising:
receiving a first paging message, the first paging message instructing the UE of a first radio bearer set to execute data transmission in radio resource control inactive (RRC_INACTIVE) state; and
as a response to receiving the first paging message, transmitting a Common Control Channel (CCCH) message;

wherein a first condition set is used to determine whether the CCCH message comprises a first sub-message, wherein when all conditions in the first condition set are met, the first message does not comprise the first sub-message; when any condition in the first condition set is not met, the CCCH message comprises the first sub-message; wherein the first condition set comprises that pending uplink data belonging to a radio bearer other than the first radio bearer set does not exist; and radio resources occupied by an initial transmission of the CCCH message are reserved for a small data transmission (SDT) procedure.

16. The method according to claim 15, wherein the first sub-message is a dedicated control channel (DCCH) message; and wherein the SDT procedure is one of an RA-SDT procedure or a CG-SDT procedure.

17. The method according to claim 15,
wherein, when all conditions in the first condition set are met, the method includes resuming all radio bearer(s) in the first radio bearer set.

18. The method according to claim 15,
wherein, when all conditions in the first condition set are met, as the response to receiving the first paging message, the method further comprises: resuming all radio bearer(s) in the first radio bearer set.

19. The method according to claim 15,
wherein, when any condition in the first condition set is not met, the method further comprises: receiving a second message in response to the CCCH message, the second message being used to instruct resuming all radio bearer(s) in the first radio bearer set and all suspended radio bearer(s) other than the first radio bearer set.

20. The method according to claim 15, wherein a radio bearer other than the first radio bearer set is not configured to execute data transmission in the RRC_INACTIVE state, or a radio bearer other than the first radio bearer set is not established.

* * * * *